July 13, 1937. L. SIMON ET AL 2,086,824
SHOCK ABSORBING DEVICE
Original Filed Feb. 4, 1932   3 Sheets-Sheet 3
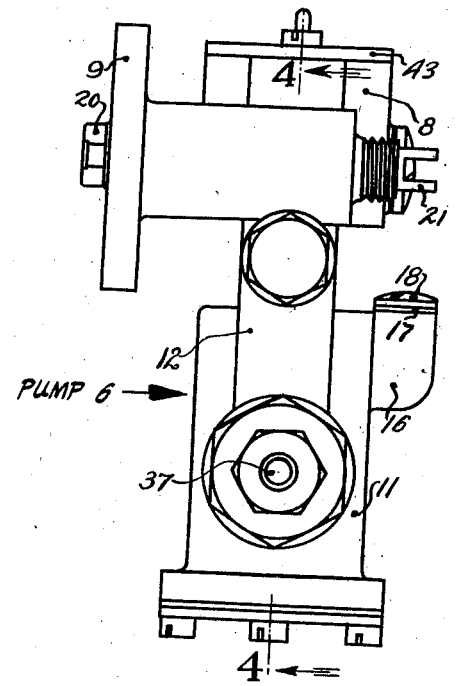
Fig. 3
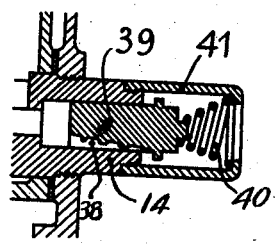
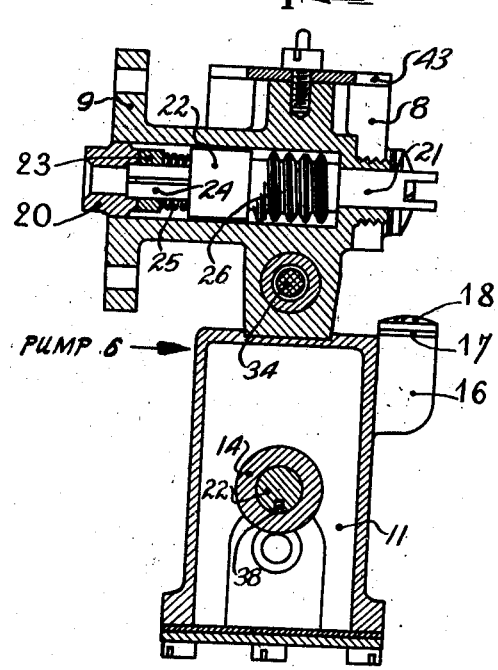
Fig. 6
Fig. 5
Inventors: Lucien SIMON,
René MARCON
by C.A. Snow & Co.
Attorneys.

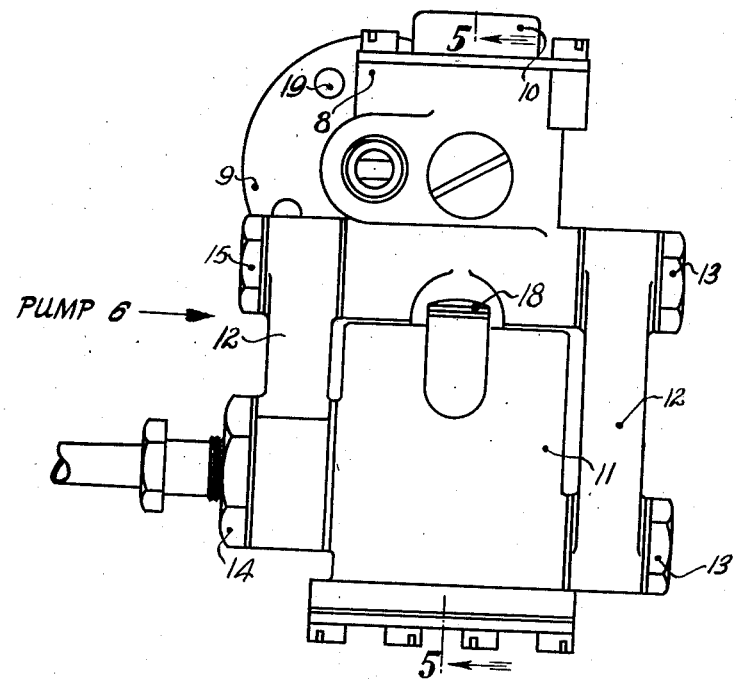
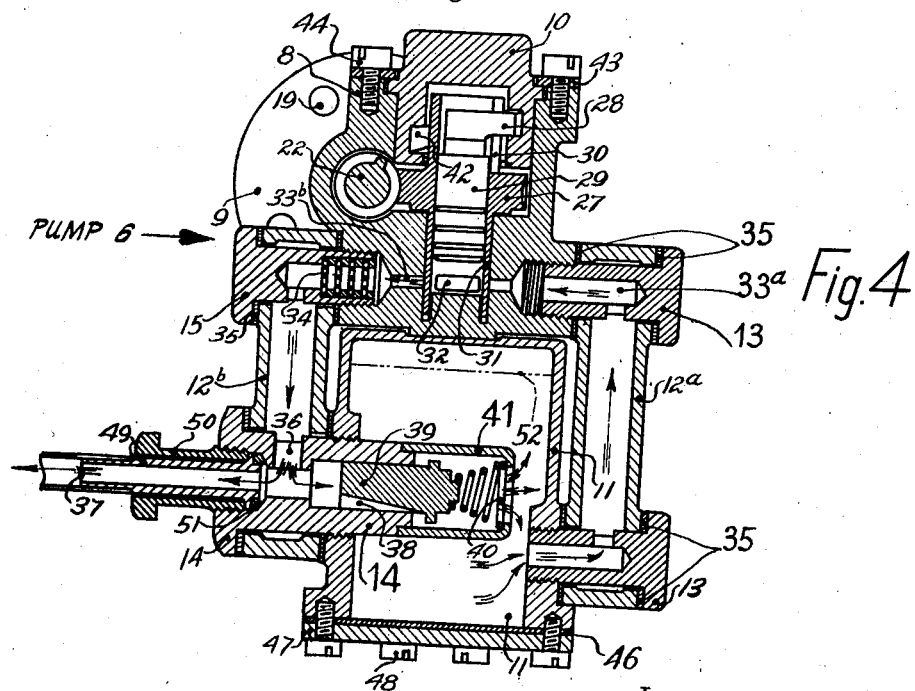

Patented July 13, 1937

2,086,824

UNITED STATES PATENT OFFICE 2,086,824

SHOCK ABSORBING DEVICE

Lucien Simon and René Marcon, Paris, France, assignors, by direct and mesne assignments, to Societe d'Exploitation des Brevets Lucien Simon (Amortisseurs Sanchok) Societe Anonyme, Paris, France Original application February 4, 1932, Serial No. 590,928. Divided and this application May 18, 1933, Serial No. 671,757. In Belgium January 26, 1932

3 Claims. (Cl. 188—130)

The present invention relates to shock absorbing devices for automobile vehicles. It is well known that a most important requirement in apparatus of that kind is that the action of the shock absorber should be automatically regulated according to the speed of the vehicle. In particular it has been imagined to exert that regulation through the action of a liquid fed by a pump driven by the engine of the vehicle in such manner as to run at a rate varying in accordance with the speed of the vehicle.

In apparatus comprising an ordinary pump, driven for instance by the driven shaft of the gear box, as soon as the vehicle is started, whatever its speed may be, the pump begins to operate and to steadily increase the pressure in the whole shock absorbing system. It is obvious for instance that, if the automobile runs for one hour at a rate of say 25 miles per hour, the pressure in the shock absorbing system will steadily increase since the pump is continuously working, in spite of the fact that the speed is uniform. It results therefrom that, for practical purposes, the pressure in the system does not vary according to the speed of the vehicle, but according to the length of time for which the vehicle has been running. On the other hand, it is obvious that after a certain time the pressure will reach such a value that the whole system will burst.

In apparatus further comprising a safety outflow orifice or valve, the last mentioned drawback is obviated but the other disadvantages above referred to remain. For in the case of the apparatus being provided with an outflow orifice or slot of uniform section, the liquid will escape through said orifice or slot with a uniform rate of flow so that the pressure in the system shall not rise and fall in accordance with the variations of the speed of the vehicle and shall not remain constant when the speed of the vehicle remains constant. Obviously, such an apparatus shall be wholly unable to produce discontinuous variations of pressure in accordance with variations of speed of the vehicle, such as are required for some kinds of vehicles for which it is necessary that within a certain range of speeds of the vehicle the pressure in the shock absorbing system should remain constant, while outside of said range of speeds that pressure should vary in accordance with the variations of speed of the vehicle.

Our experiments on the question have shown that, in a satisfactory shock absorbing system of the type above referred to the pressures should vary about as follows:—

At a speed of _____ 13 miles per hour 15 lbs. per sq. inch
At a speed of _____ 19 miles per hour 29 lbs. per sq. inch
At a speed of _____ 37 miles per hour 42 lbs. per sq. inch
At a speed of _____ 56 miles per hour 57 lbs. per sq. inch
At a speed of _____ 62 miles per hour 64 lbs. per sq. inch
At a speed exceeding_ 75 miles per hour 75 lbs. per sq. inch On the other hand, if the apparatus is provided with a safety valve, the risk of bursting the system as a result of an excessive pressure is avoided but all the other disadvantages remain.

This is due to the fact that the valve will act for relieving the pressure only when said pressure becomes excessive and only as long as it will remain excessive, but as long as said excessive pressure is not reached, the system has all of the disadvantages above stated.

Taking for instance the example above referred to of an automobile running for one hour at a speed of 25 miles per hour, the pressure in the shock absorbing system would increase while the speed of the vehicle is uniform until it reaches such a value that the safety valve is brought into play. From that time on, as the maximum pressure is reached, the automobile might pass from a speed of 25 miles per hour to a speed of 50, 60 or even 70 miles per hour without modifying the pressure in the shock absorbing system.

Furthermore, such an apparatus would not allow of maintaining a uniform pressure in the shock absorbing system when the speed of the vehicle is uniform or varies only within a given range of speeds.

The chief object of the present invention is to provide a pump adapted to be driven by the engine of a motor vehicle for providing a liquid pressure for the shock absorbing system thereof, which causes said pressure to vary in accordance with the speed of the vehicle, no matter for how much time said vehicle has been running.

Another object of the invention is to provide a pump of that type that causes the pressure in the shock absorbing system to rise when the speed increases and to fall when the speed decreases.

Another object of the invention is to provide a pump of that type that causes the pressure to remain constant when the speed of the vehicle is uniform or varies only within certain limits.

According to the present invention, we obtain these results by inserting between the discharge pipe of the pump and the reservoir thereof a valve of variable section of flow responsive to the variations of pressure in said discharge pipe and subjected to the action of a spring opposing the action of the pressure thereon. Such a valve allows a portion of the liquid discharged by the pump to flow back into the reservoir, said portion being such that the pressure produced by said pump in the shock absorbing system varies in accordance with the speed of the vehicle.

According to a preferred embodiment of our invention, said valve consists of a piston having a longitudinal groove provided in its periphery and subjected at one end to the action of the pressure in the discharge pipe and at the other end to the action of a spring acting in the opposite direction. The section of the groove varies along its length so that the section of the passage existing between said groove and the conduit in which the piston is slidably mounted depends on the position of said piston in said conduit and therefore on the pressure in said discharge pipe.

Preferred embodiments of our invention will be hereinafter described with reference to the accompanying drawings, given merely by way of example, and in which:

Fig. 2 is an elevational view of the pump according to the present invention;

Fig. 3 is a corresponding side view;

Fig. 4 is a sectional view on the line 4—4 of Fig. 3;

Fig. 5 is a sectional view on the line 5—5 of Fig. 2;

Fig. 6 is a detail view showing a particular form of the valve.

Figure 1:
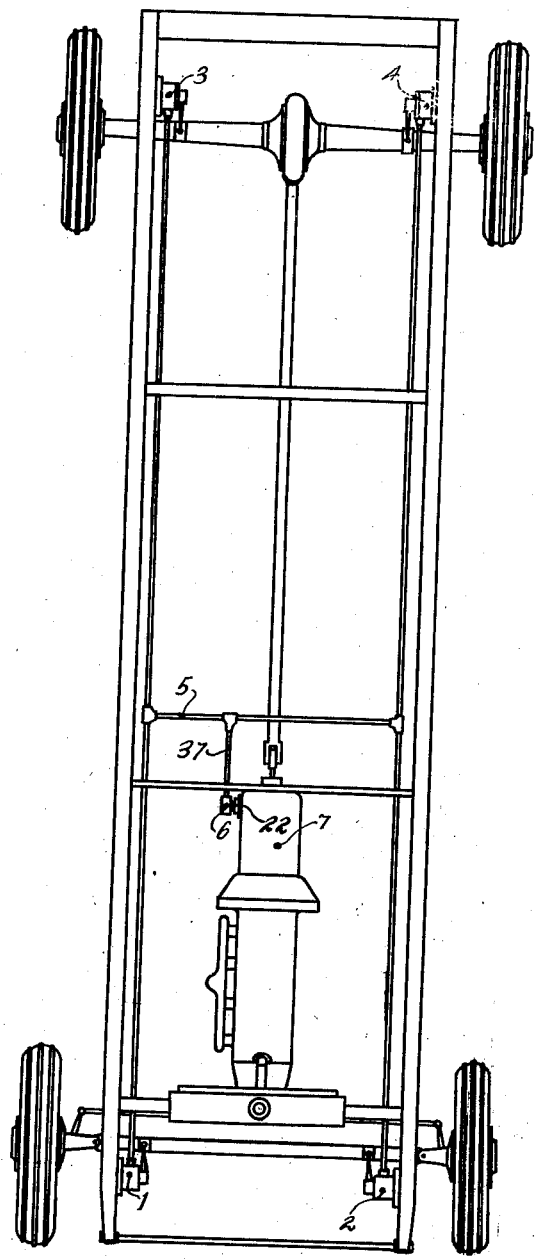
Fig. 1 is a general view of the type of shock absorbing device with which the invention is concerned.

In order to better explain the nature of our invention, the general shock absorbing system in connection with which it is intended to operate is diagrammatically shown in Fig. 1. It comprises two front shock absorbers 1 and 2 and two rear shock absorbers 3 and 4 of the friction type provided with controlling cam surfaces such as described, for instance, in the U. S. Patents No. 1,921,951, of Aug. 8, 1933, to Lucien Simon et al., and No. 2,009,749, of July 30, 1935, to Lucien Simon et al. The regulation of the shock absorbers is automatically insured through telemechanical controlling means including an oil pipe 5 secured in any suitable manner and adapted to withstand high pressures and a pump 6 coupled with the gear box 7 of the vehicle at the place where the speedometer is generally connected with said gear box.

The operation is as follows: When the vehicle is stopped, pump 6 does not discharge any liquid and accordingly no pressure is exerted by said liquid on said shock absorbers. When the vehicle is running the pump discharges liquid at a rate proportional with the speed of the vehicle and the liquid under pressure transmits to the braking organs of the shock absorbers an action varying in accordance with the speed of the vehicle. In other words the braking action in the shock absorbers increases when the speed increases, decreases when the speed decreases, and remains constant when the speed is uniform.

As shown in Figs. 2 to 5, the pump corresponding to reference character 6 of Fig. 1, consists of a piece 8 forming a cylinder and which is provided with a flange 9 through which it is secured to the gear box of the vehicle. The rate of flow of the pump can be adjusted through a piece 10 which can be easily reached so as to allow the initial adjustment corresponding to each vehicle as it will be hereinafter explained. An oil reservoir 11 is connected to pump 8 through two conduits 12a and 12b, the whole being assembled through bolts 13, 14, and 15. Reservoir 11 can be filled through its inlet orifice 16 and it is closed by means of a stopper 18, a gasket 17 being provided between the stopper and its seat. The apparatus is secured to the gear box through suitable means engaging fixation holes 19, and the pump is driven through coupling 20 which, in turn, transmits the movement of the engine to the speedometer through coupling 21 (Figs. 3 and 5).

The pump is driven through shaft 22 (Figs. 4 and 5). The irreversibility of the drive is obtained by means of a dog clutch 23 which, when the vehicle is running in reverse gear, ceases to engage driving member 20, due to its sliding along grooved shaft 24 against the action of spring 25 which tends to maintain the parts in mesh. A worm 26 is adapted to mesh with a worm wheel 27 to which it imparts a rotary motion in a clockwise direction. Said worm wheel is integral with a sleeve 31 fitting in the bore of cylinder 8 and provided with a longitudinal slot 30. A piston 29 is adapted to move inside said sleeve. Said piston is provided with a lug 28 extending through said slot 30 of sleeve 31 and adapted to engage a cam groove 42 provided in piece 10. Said lug causes piston 29 to rotate about its axis under the action of sleeve 31 integral with wheel 27, and to reciprocate within said sleeve as a result of the engagement of said lug in groove 42. A port 32 is provided at the lower part of sleeve 31 so as to intermittently uncover the respective orifices of an oil inlet conduit 33a connected with reservoir 11 through inlet pipe 12a and an oil outlet conduit 33b leading to the outlet conduit 12b. The piston draws in a certain quantity of liquid from reservoir 11 through pipe 12a, conduit 33a, and port 32. Then as sleeve 31 further rotates, the orifice of inlet conduit 33a is stopped and the oil begins to be compressed in the lower part of the sleeve by the downward movement of piston 29. When sleeve 31 has rotated through 180°, port 32 uncovers the orifice conduit 33b, and the oil is driven out through the outlet pipe 12b, after a quadruple filtering through filters 34 provided in hollow bolt 15.

Gaskets 35 insure the fluidtightness of the connections of pipes 12a and 12b with pump 8 and with reservoir 11. The oil that is forced from the pump into outlet pipe 12b moves in a downward direction.

The operation is as follows:

It should first be well understood that pipe 5 (Fig. 1) is quite free from air and is filled with special oil.

A certain amount of oil enters through orifice 36 of hollow bolt 14. According to the principle of communicating vessels, the pressure is equal in all the parts of the system. The oil in question is therefore discharged through orifice 36, and it is therefore distributed in such a way as to answer all the requirements of the system, that is toward feed pipe 37 and toward reservoir 11 into which it is by-passed through the progressive opening of a passage 38 provided in the small piston valve 39. Said valve is normally applied in its seat, when the pump is not working, by pyramid-shaped spring 40, which is adjusted in the proper position by means of a hollow cover 41 screwed at the end of bolt 14. Valve 39 is moved against the action of said spring under the effect of the continuous or successive pressures to which the liquid is subjected, and its displacements are proportional with the needs, so as to let pass through opening 38, proportionally with the speed of the vehicle, a portion of the liquid subjected to a pressure that exceeds the pressure in the reservoir at that very time.

If it be supposed that the speed of the vehicle increases, the pressure to which the oil is subjected in the pipes increases as a function of the speed of the vehicle, which determines the speed of revolution of the pump. The pressure exerted on the shock absorbers is therefore increased so as to brake them progressively more and more.

The strength of spring 40 and the shape of slot 38 are so chosen as to regulate the drop of pressure through the passage leading oil back to reservoir 11 in such manner that the pressure in the system may vary as a function of the speed of the vehicle according to a given law.

If it be supposed that the speed of the vehicle decreases, the oil pressure in the pipes decreases proportionally with the speed of the vehicle. As the pressure exerted on the shock absorbers decreases, the friction between the organs of said shock absorbers is accordingly diminished, so as to adjust the resistance of said shock absorbers in accordance with the speed of the vehicle.

If it be supposed that a determined speed of the vehicle is maintained for a certain time, the oil pressure is maintained in the pipes at a value that is a function of the speed in question and the section of flow through opening 38 of valve 39 which compresses spring 40.

These three cases are given by way of example so as to illustrate all the conditions of working of the apparatus. Each apparatus has its own adjustment, which can be determined by means of three organs so as to adapt said apparatus to a vehicle of any kind whatever, whatever its weight and its speed may be. Said organs are:

(a) Springs 40 of different strengths;
(b) Valves 39 provided with apertures of different sizes and shapes; and
(c) A piece 10 rotatably mounted so as to displace the angular position of cam surface 42 in which lug or finger 28 of piston 29 moves, in which reference to the axis of the cylinder, so that it is possible to vary the useful or active portion of the piston stroke. In other words, by adjusting the piece 10 annularly, the high point of the cam therein can be brought to position over the orifice 33ª, as shown in Figure 4 or to any other desired position, so as thus to cause the piston to start its pressure stroke while each orifice 33ª and 33ᵇ is closed, as shown in Figure 4, or, if preferred, while one of these orifices is partly open to any predetermined extent. A locking ring, secured through screws 44, serves to fix piece 10 in the desired position.

In order to keep the pressure constant between certain limits of speed, a condition that is desirable for certain classes of vehicles, the bottom of groove 38 of piston valve 39 may have a shape that is not rectilinear in longitudinal section. We can, for instance provide that when piston valve 39 moves a certain distance, from a given position to another given position, the section of flow through groove 38 remains constant or better varies according to a law that is not proportional so that the pressure in the pipes of the system may remain constant.

Such an arrangement is shown in Fig. 6 which shows in axial section the by-pass valve 39. The bottom of groove 38 has been given such a shape as to present along certain portions thereof a particular curvature making it possible to keep constant or to vary according to a predetermined law the section of flow of the liquid through the groove for certain portions of the displacement of the piston valve 39.

Of course in the case of vehicles for which it is desirable that the pressure in the shock absorbing system should vary progressively in accordance with the speed of the vehicle, the bottom of the groove shall be rectilinear, as shown in Fig. 4.

The apparatus may optionally comprise the following features: The base of reservoir 11 is removable so as to facilitate the cleaning thereof; a gasket 46 and a cover plate 47 fixed through screws 48 insure perfect fluidtightness.

The connection of the pipes of the shock absorbing system with the pump is ensured, at the extremity of outlet pipe 12 by a part 49 to which is welded said pipe of the shock absorbing system, the whole being held by an elongated nut 50, which squeezes a packing 51.

Hollow bolt 14 is readily accessible for removing the parts and replacing organs 39—40, in the same manner as bolt 15 which is provided with filters.

Attention is again called to the fact that the apparatus, given merely by way of example, cannot work in both directions. It is for that reason that a dog coupling 23 is provided in the driving means of the pump. The level 52 of the oil in the reservoir can move down without danger provided that it does not come as low as the orifice of inlet pipe 12.

As no leakage of oil should normally happen, the apparatus has been provided with a reservoir of small capacity which may be increased according to the needs.

While we have described what we deem to be a practical and efficient embodiment of our invention, it should be well understood that we do not wish to be limited thereto as there might be changes made in the arrangement, disposition and form of the parts without departing from the principle of our invention as comprehended within the scope of the appended claims.

In these claims it should be understood that the term "working conditions" of the engine is intended to include all conditions in which the engine is running and drives, or is capable of driving, the vehicle, excluding conditions corresponding to the starting period, during which the pump driven by the engine has not yet built up a pressure sufficient for overcoming the action of elastic means 40 so as to keep the piston valve in the open position.

What we claim is:

1. In a vehicle adapted to be driven by an engine and including shock absorbers adapted to be regulated by the action of a liquid under pressure, a pump for providing a liquid pressure for said shock absorbers, which comprises in combination, a cylinder, a cylindrical sleeve fitted in said cylinder and provided with a port, a piston fitted in said sleeve, means for causing said sleeve to rotate about its axis and said piston to reciprocate therein synchronously therewith, a reservoir, an inlet pipe connected with said reservoir and opening into said cylinder at a point located at the same level as said port, a discharge pipe opening into said cylinder at a point thereof diametrally opposed to said inlet pipe, a valve of variable section of flow responsive to variations of pressure in said discharge pipe inserted between said pipe and said reservoir, and elastic means for acting on said valve in opposition to the action of said pressure, said elastic means being of such strength as to allow said valve to remain open under the effect of the pressure built up by said pump in its discharge pipe under working conditions of the engine.

2. In a vehicle adapted to be driven by an engine including shock absorbers adapted to be regulated by the action of a liquid under pressure, an apparatus for providing a liquid pressure for said shock absorbers, which comprises in combination, a cylinder, a cylindrical sleeve fitted in said cylinder and provided with a port, a piston fitted in said sleeve, means for causing said sleeve to rotate about its axis and said piston to reciprocate therein synchronously therewith, a reservoir, an inlet pipe connected with said reservoir and opening into said cylinder at a point thereof located at the same level as said port, a discharge pipe opening into said cylinder at a point thereof diametrally opposed to the point where said inlet pipe opens thereinto, a cylindrical passage connecting said discharge pipe with said reservoir, a piston valve fitting in said cylindrical passage having in its periphery a longitudinal groove whose section varies along its length so that the section of flow of the liquid through said passage varies according to the position of the piston valve therein, and elastic means for acting on said piston valve in opposition to the action of the liquid under pressure in the discharge pipe thereon, said elastic means being of such strength as to allow said valve to remain open under the effect of the pressure built up by said pump in its discharge pipe under working conditions of the engine.

3. In a vehicle adapted to be driven by an engine and including shock absorbers adapted to be regulated by the action of a liquid under pressure, a pump for providing a liquid pressure for said shock absorbers which comprises in combination, a cylinder provided with a cam groove, a sleeve provided with a longitudinal groove fitting in said cylinder, a piston slidably mounted in said sleeve, a lug integral with said piston extending through said slot into said cam groove, means for rotating said sleeve, a port at one end of said sleeve, a reservoir, an inlet pipe opening at one end into said reservoir and at the other end into said cylinder at the level of said port, a discharge pipe opening into said cylinder at a point thereof diametrally opposed to said inlet pipe, a cylindrical passage connecting said discharge pipe with said reservoir, a piston valve fitting in said cylindrical passage having in its periphery a longitudinal groove whose section varies along its length so that the section of flow of the liquid through said passage varies according to the position of the piston therein, a perforated cover fixed to the end of said passage that opens into said reservoir, and a pyramid-shaped spiral spring interposed between said cover and the end of the piston that projects into said reservoir, said spring being of such a strength as to allow said valve to remain open under the effect of the pressure built up by the pump in its discharge pipe under working conditions of the engine.

RENÉ MARCON.
LUCIEN SIMON.